(12) United States Patent
Nommensen

(10) Patent No.: US 12,049,106 B2
(45) Date of Patent: Jul. 30, 2024

(54) VEHICLE RECOVERY BOARD

(71) Applicant: Ensen Pty Ltd, Norman Park (AU)

(72) Inventor: David Nommensen, Norman Park (AU)

(73) Assignee: ENSEN PTY LTD, Norman Park (AU)

( * ) Notice: Subject to any disclaimer, the term of this patent is extended or adjusted under 35 U.S.C. 154(b) by 142 days.

(21) Appl. No.: 17/233,905

(22) Filed: Apr. 19, 2021

(65) Prior Publication Data

US 2021/0339565 A1    Nov. 4, 2021

(30) Foreign Application Priority Data

Apr. 29, 2020  (AU) ................................ 2020901343

(51) Int. Cl.
  *B60B 39/12* (2006.01)
(52) U.S. Cl.
  CPC .................... *B60B 39/12* (2013.01)
(58) Field of Classification Search
  CPC ......... B60B 39/12; B60B 39/00; B60B 15/00; B60B 2900/721; B60C 27/00; E01C 9/08; E01C 9/086; E01C 9/083; B66F 7/00; B66F 7/243
  USPC .......................................................... 238/14
  See application file for complete search history.

(56) References Cited

U.S. PATENT DOCUMENTS

| | | | | |
|---|---|---|---|---|
| 3,008,643 A | * | 11/1961 | Tanner ..................... | B60B 39/12 238/14 |
| 3,342,414 A | * | 9/1967 | Jureit ..................... | B60B 39/12 238/14 |
| 3,616,111 A | * | 10/1971 | Raech, Jr. ............... | E01C 9/086 156/304.3 |
| 4,223,835 A | * | 9/1980 | Witt ........................ | B60B 39/12 238/14 |
| 4,840,309 A | * | 6/1989 | Teresi ..................... | B60B 39/12 238/14 |
| 10,661,606 B2 | * | 5/2020 | McCarthy ............... | B60B 39/12 |
| 2017/0174000 A1 | * | 6/2017 | Dagrossa ................. | E01C 15/00 |
| 2019/0242068 A1 | * | 8/2019 | Penland, Jr. ........... | B32B 21/045 |
| 2020/0047553 A1 | * | 2/2020 | Harrington ............. | B60B 39/12 |
| 2020/0307313 A1 | * | 10/2020 | Hadley ................... | B60B 39/12 |

FOREIGN PATENT DOCUMENTS

| | | |
|---|---|---|
| AU | 2012205168 A1 | 8/2012 |
| AU | 2013101564 A4 | 1/2014 |
| AU | 2015100150 B4 | 10/2015 |
| AU | 2018204378 A1 | 1/2019 |

(Continued)

*Primary Examiner* — Zachary L Kuhfuss
*Assistant Examiner* — Cheng Lin
(74) *Attorney, Agent, or Firm* — Shumaker, Loop & Kendrick, LLP

(57) ABSTRACT

A vehicle recovery board including an inner layer fabricated from a first material, the inner layer including a first face and an opposed second face, in which the first face and the second face each include a plurality of inner layer projections extending outwardly therefrom; and an outer layer fabricated from a second material, the outer layer is configured to substantially overlie the first face and the second face of the inner layer, in which the outer layer includes a plurality of outer layer projections extending outwardly therefrom, in which at least a portion of the plurality of outer layer projections are formed over at least a portion of the inner layer projections.

22 Claims, 7 Drawing Sheets

(56) References Cited

FOREIGN PATENT DOCUMENTS

| AU | 2013101781 B4 | 5/2019 |
|---|---|---|
| AU | 2014101621 A4 | 5/2019 |
| AU | 2018200543 B2 | 12/2019 |
| AU | 2019100193 B4 | 2/2020 |
| WO | 2007041802 A1 | 4/2007 |
| WO | 2017070740 A1 | 5/2017 |
| WO | 2017075665 A1 | 5/2017 |
| WO | 2018068083 A1 | 4/2018 |
| WO | 2018/204880 A1 | 11/2018 |

* cited by examiner

VEHICLE RECOVERY BOARD

TECHNICAL FIELD

The present invention relates to a vehicle recovery board. In particular, the present invention relates to a vehicle recovery board having improved durability and/or traction.

BACKGROUND

Recovery boards are typically used in order to assist in freeing a vehicle that has become bogged. Recovery boards typically comprise an elongate board including a number of traction members in the form of projections that provide traction for the wheels of the vehicle. Specifically, the recovery board is placed under a wheel of a vehicle in order to provide sufficient traction to allow the vehicle to be driven or pulled out of the sand or mud in which it is bogged.

Conventional recovery boards are typically fabricated from a polymeric material. While this makes the boards relatively light and therefore easy to use, the use of low density polymers can result in damage to the recovery board if, for example, the spinning of a vehicle's wheel on the recovery board generates sufficient heat to melt the polymer from which the traction members are formed. On the other hand, the use of high density polymers make the recovery boards heavier, less flexible and more difficult to use.

Some attempts have been made to overcome this issue. For instance, Australian patent no. 2016349949 describes a vehicle recovery board in which a plurality of replaceable traction members is provided on the surface of the recovery board. This allows a user to replace individual traction members if they are damaged, however the production of a vehicle recovery board having a large number of replaceable traction members around which the board is moulded is both time-consuming and expensive.

Thus, there would be an advantage if it were possible to provide a vehicle recovery board with improved resilience and durability in comparison to conventional recovery boards, but that was also relatively low cost, durable and easy to produce.

It will be clearly understood that, if a prior art publication is referred to herein, this reference does not constitute an admission that the publication forms part of the common general knowledge in the art in Australia or in any other country.

SUMMARY

The present invention is directed to a vehicle recovery board which may at least partially overcome at least one of the abovementioned disadvantages or provide the consumer with a useful or commercial choice.

With the foregoing in view, in a first aspect the present invention resides broadly in a vehicle recovery board comprising:

an inner layer fabricated from a first material, the inner layer including a first face and an opposed second face, wherein the first face and the second face each comprise a plurality of inner layer projections extending outwardly therefrom; and an outer layer fabricated from a second material, the outer layer configured to substantially overlie the first face and the second face of the inner layer, wherein the outer layer comprises a plurality of outer layer projections extending outwardly therefrom, and wherein at least a portion of the plurality of outer layer projections are formed over at least a portion of the inner layer projections.

The vehicle recovery board may be of any suitable size, shape or configuration. However, typically vehicle recovery boards have a greater length than width so as to provide a length of recovery board for the wheel of a vehicle to move along. The vehicle recovery board may have any suitable length, although it will be understood that if the vehicle recovery board is too long then it may be relatively difficult and heavy for a user to handle and use. Similarly, if the vehicle recovery is too short, it may be of insufficient length for the vehicle to be able to drive out of the terrain in which it is bogged.

While the width of the vehicle recovery board is not critical to the invention, it is envisaged that the width of the vehicle recovery board will be approximately similar to the width of a vehicle tyre.

The inner layer may be of any suitable size, shape and configuration. Preferably, however, the inner layer is provided with a shape that is generally the same as the vehicle recovery board. The inner layer may be of unitary structure or may be fabricated from two or more pieces that are configured for connection to one another or are retained in place relative to one another within the vehicle recovery board by the outer layer. The two or more pieces may be placed in abutment with one another, at least partially overlapping one another, or spaced apart from one another.

In a preferred embodiment of the invention, the inner layer may be a unitary structure. The inner layer may extend along at least a portion of the length of the vehicle recovery board and at least a portion of the width of the vehicle recovery board. Preferably, the inner layer may extend along substantially the entire length of the vehicle recovery board and/or substantially the entire width of the vehicle recovery board. The inner layer may be of substantially constant dimensions along its length and/or width or the dimensions of the inner layer may vary across its length and/or width.

Preferably, the inner layer is generally planar in form. Thus, the inner layer may comprise a plate or sheet of the first material. The inner layer may be fabricated from a single layer of the first material or may be fabricated from two or more layers of the first material. In this embodiment of the invention, opposed surfaces of the inner layer (and, more specifically, the plate or sheet of the inner layer) may comprise the first face and the second face. In embodiments of the invention in which the inner layer comprises two or more layers of the first material, the two or more layers of first material may be oriented in the same direction as each other, or may be oriented in different directions to one another so as to provide the inner layer with additional strength and/or to reinforce the inner layer, and therefore the vehicle recovery board.

The inner layer may be substantially planar other than the inner layer projections. Alternatively, one or more ridges may be provided in the inner layer. The one or more ridges may be of any suitable size and may extend in any suitable direction. In a preferred embodiment of the invention, one or more ridges may extend substantially longitudinally along the inner layer. In a specific embodiment, one or more ridges may extend along substantially the entire length of the inner layer. It is envisaged that the one or more ridges may provide additional mechanical strength and or rigidity to the inner layer, and therefore the vehicle recovery board.

The one or more ridges may be formed integrally with the inner layer, or may be formed separately therefrom and adapted for fixed connection thereto. In embodiments in which the one or more ridges are formed integrally with the inner layer, it is envisaged that the one or more ridges may be formed by bending or folding the inner layer to form the ridge. Thus, in this embodiment, the one or more ridges may appear as a ridge in the first or second face of the inner layer, but will also form a channel or recess in the other of the first or second face of the inner layer.

It is envisaged that the vehicle recovery board may be capable of flexing or bending. In this way, the vehicle recovery board may flex or bend to match a feature of the terrain in which it is being used, or may bend or flex to provide a more beneficial angle to allow a vehicle to gain traction on the vehicle recovery board. Thus, it is preferred that the inner layer (and indeed the vehicle recovery board) is relatively thin.

The vehicle recovery board may bend or flex in any suitable direction. For instance, the vehicle recovery board may bend or flex in a lateral direction, a longitudinal direction or a combination thereof. Thus, it is envisaged that the first material and the second material may be resiliently deformable. Specifically, it is envisaged that the first material and the second material may be capable of bending or flexing without breaking, deforming or otherwise failing. Preferably, the first material and the second material are different materials to one another.

In a preferred embodiment of the invention, the first material from which the inner layer is fabricated is of greater rigidity than the second material. The first material may also differ from the second material in a number of other properties, such as melting point, wear resistance, mechanical strength, conductivity, corrosion resistance and the like, or any suitable combination thereof. Thus, it is envisaged that the inner layer may act as a skeleton within the vehicle recovery board. In these embodiments of the invention, it is envisaged that the inner layer may be fabricated from a relative durable first material. Preferably, the inner layer acts as a reinforcing layer or member within the vehicle recovery board.

In some embodiments of the invention, the first material may comprise a polymeric material, a metallic material, a ceramic material or any suitable combination thereof. In a preferred embodiment of the invention, the first material may comprise a metallic material. Any suitable metallic material may be used, although it will be understood that metallic materials having one or more desirable physical properties (such as being relatively lightweight, relatively durable, relatively conductive, relatively magnetic, relatively resiliently deformable and so on) is preferred. Thus, in specific embodiments of the invention, the first material may comprise steel (including mild steel, stainless steel or the like), titanium or alloys thereof, aluminium or alloys thereof, or the like. In a most preferred embodiment of the invention, the first material may comprise aluminium.

The inner layer may be fabricated using any suitable technique. For instance, the inner layer may be cast, rolled, extruded or the like. The projections on the first face and the second face may be of any suitable form. However, in a preferred embodiment of the invention, the inner layer projections are formed integrally with, or formed from, the inner layer. In other embodiments of the invention, the inner layer projections may be formed separately from the inner layer but may be configured for fixed connection thereto (such as by welding, brazing or the like).

For example, in embodiments of the invention in which the inner layer is cast or extruded, the inner layer projections may be formed during the fabrication process. In other embodiments of the invention, the inner layer projections may be formed from the material in the inner layer. For instance, the inner layer projections may be formed by stamping, pressing or otherwise cutting the inner layer to form a tab and then moving the tab relative to the planar portion of the inner layer to form the inner layer projection. In this embodiment, it is envisaged that a first plurality of tabs may be moved in a first direction relative to the planar portion in order to form inner layer projections extending from the first face of the inner layer while a second plurality of tabs may be moved in a second direction relative to the planar portion in order to form inner layer projections extending from the second face of the inner layer. The tabs may be moved relative to the planar portion of the inner layer during the process of forming the tabs or may be moved relative to the planar portion in a subsequent process.

The inner layer projections may be located in any suitable location and at any suitable projection density on the inner layer. It is envisaged, however, that sufficient inner layer projections may be provided in order to provide the vehicle recovery board with both adequate grip and/or traction on a ground surface under a variety of conditions and types of ground surfaces. In addition, it is envisaged that sufficient inner layer projections may be provided in order to ensure that the tyre of a vehicle may grip and/or gain traction on the vehicle recovery board. Preferably, sufficient inner layer projections may be provided so that the tyre may grip and/or gain traction on the vehicle recovery board regardless of the make of the tyre, tread pattern, size, tyre pressure (high or low) and so on.

The inner layer projections may be located at regular distances from one another. Alternatively, the inner layer projections may be placed in a regular or irregular pattern.

Preferably, the inner layer of the vehicle recovery board may be provided with one or more apertures therethrough. Any suitable number of apertures may be provided. The apertures may be formed by the movement of a tab relative to the planar portion of the inner layer or may be formed through the removal of material from the inner layer (such as by stamping, pressing, cutting or the like). It is envisaged that the one or more apertures may be provided to allow the second material from which the outer layer is fabricated to pass through the one or more apertures during application of the outer layer to the inner layer. The material of the outer layer may pass through the one or more apertures in any suitable manner. For instance, if the material of the outer layer is applied in the form of a hardenable liquid, the hardenable liquid may flow through the apertures. Alternatively, the outer layer may comprise an upper member and a lower member configured to connect to one another. In this embodiment of the invention, it is envisaged that the upper member and/or the lower member may be provided with one or more locking members configured to pass through the apertures in the inner layer and connect to the other of the upper member or the lower member.

In some embodiments of the invention, one or more apertures in the inner layer may align with one or more apertures in the outer layer. Thus, one or more apertures may extend through the vehicle recovery board. The one or more apertures may be provide in order to allow material (such as sand, water and the like) that accumulate on the outer surface to drain and pass through so as not to decrease the traction on the outer surface of the vehicle recovery board. In other embodiments, the one or more apertures may be provided to allow the vehicle recovery board to be connected to a surface when in use or, for instance, to a vehicle during storage and transportation.

The inner layer projections may all be of the same size and shape. Alternatively, the inner layer projections may be of two or more shapes and/or sizes. In use, a first face of the vehicle recovery board (oriented in the same manner as the first face of the inner layer) and a second face of the vehicle recovery board (oriented in the same manner as the second face of the inner layer) may be oriented in any direction relative to the ground surface on the vehicle recovery board is to be used. In other words, the vehicle recovery board may be oriented in use so that either the first face of the vehicle recovery board or the second face of the vehicle recovery board is placed in abutment with the ground surface.

More preferably, however, the first face of the vehicle recovery board may be configured to face generally upwardly when the vehicle recovery board is in use, while the second face of the vehicle recovery board may be configured to face generally downwardly when the vehicle recovery board is in use. In this embodiment of the invention, the second face of the vehicle recovery board may be placed at least partially in abutment with the ground surface, while the first face of the vehicle recovery board may positioned so that the tyre of a vehicle passes along the first face of the vehicle recovery board as the vehicle moves relative to the vehicle recovery board.

The outer layer may be fabricated from any suitable second material. However, as previously stated, it would be advantageous to provide a vehicle recovery board that is relatively lightweight, relatively durable and/or is capable of bending or flexing. Thus, it is envisaged that the second material may be a material that provides one or more of these properties.

In a preferred embodiment of the invention, the second material may be a polymeric material. Any suitable polymeric material may be provided, such as a polyethylene, polypropylene, acrylonitrile styrene acrylate, nylon or the like, or any suitable combination thereof. In some embodiments of the invention, the second material may be provided with certain properties, such as wear resistance, chemical resistance, UV resistance, impact resistance, abrasions resistance and the like, or any suitable combination thereof. In some embodiments of the invention the second material may be a fibre-reinforced polymeric material. In a most preferred embodiment of the invention, the second material may comprise a UV stabilised nylon or a UV stabilised polypropylene.

As previously stated, the outer layer is configured to substantially overlie the first face and the second face of the inner layer. Thus, in some embodiments of the invention, the inner layer may be entirely encapsulated within the outer layer. In other embodiments, the outer layer may overlie the first face and the second face of the inner layer, but one of more edges of the inner layer may be exposed. In yet further embodiments, one or more of the inner layer projections may protrude through the outer layer.

The inner layer may extend to at or adjacent the periphery of the vehicle recovery board about at least a portion of the periphery of the vehicle recovery board. Alternatively, the inner layer may be spaced inwardly from the periphery of the vehicle recovery board about at least a portion of the periphery of the vehicle recovery board. For instance, the vehicle recovery board may be provided with one or more apertures therethrough (for instance in order to form a handle or grip portion by which a user may hold or manipulate the vehicle recovery board). In these embodiments, it is envisaged that the inner layer may be spaced inwardly from the periphery of the vehicle recovery board such that the one or more apertures may be formed between the periphery of the vehicle recovery board and an edge of the inner layer.

The outer layer and the inner layer may be formed together using any suitable technique. For instance, the inner layer and the outer layer may be connected to one another using adhesives, mechanical fasteners or the like. Alternatively the outer layer may be formed over the inner layer. In a particular embodiment of the invention, the outer layer may be moulded onto the inner layer. Any suitable moulding process may be used, although in a specific embodiment, the outer layer may be injection moulded onto the inner layer.

As previously stated, the outer layer comprises a plurality of outer layer projections. At least a portion of the outer layer projections are formed over at least a portion of the inner layer projections. More preferably, outer layer projections may be formed over all of the inner layer projections. It is also envisaged that one or more outer layer projections may be formed that do not overlie an inner layer projection.

At least a portion of the outer layer projections may have the same general shape as the inner layer projections over which they are formed. Alternatively, at least a portion of the outer layer projections may have a different shape to the inner layer projections over which they are formed. In embodiments of the invention in which the first face of the vehicle recovery board (corresponding to the first face of the inner layer) is configured to be placed in abutment with a ground surface, it is envisaged that at least a portion of the outer layer projections on the first face of the vehicle recovery board may be shaped to engage with the ground surface to reduce or eliminate movement of the vehicle recovery board relative to the ground surface when the vehicle moves onto the vehicle recovery board. In a preferred embodiment of the invention, at least a portion of the outer layer projections on the first face of the vehicle recovery board may be provided with one or more ground-engaging portions configured to at least partially penetrate the ground surface so as to reduce or eliminate movement of the vehicle recovery board relative to the ground surface in use. The ground-engaging portions may be of any suitable form, and may include one or more points, needles, claws or the like, or any suitable combination thereof. In some embodiments, the ground-engaging portions may comprise one or more serrations or serrated members. In this way, the ground-engaging members may be configured to engage with relatively hard surfaces (including compacted earth, frozen earth and/or ice).

In a preferred embodiment of the invention, at least a portion of the outer layer projections on the first surface of the vehicle recovery board may be shaped so that the ground-engaging portions thereof are oriented generally towards the rear of the vehicle recovery board.

In embodiments of the invention in which the second face of the vehicle recovery board (corresponding to the second face of the inner layer) is configured to be placed facing generally upwardly so that a vehicle tyre may be driven onto the second face, it is envisaged that at least a portion of the outer layer projections may be shaped to be received within the tread pattern of the vehicle tyre (and in particular within the grooves of the tread pattern). In this way, the traction of the vehicle tyre on the vehicle recovery board may be increased.

Preferably, at least one of the outer layer projections may be configured to enhance the engagement of the outer layer projection and the tread (and in particular a groove within the tread pattern). The engagement may be enhanced in any suitable manner. However, in a preferred embodiment of the invention, the outer layer projection may be shaped so as to enhance the connection between it and the tread.

The outer layer projections may be provided with any suitable shape. However, it is envisaged that the outer layer projections may comprise one or more engagement portions in the form of one or more points, vertices, apexes or the like configured to engage with, or at least abut, the tread in use. Preferably, the engagement portions may be configured to engage with the tread (and in particular an inner surface of a groove within the tread pattern) in a frictional engagement. It is envisaged that the frictional engagement between the engagement portions and the tread will be strong enough to provide improved traction or grip between the vehicle tyre and the vehicle recovery board, but not so strong that the engagement portions cannot be readily disengaged from the tread as the vehicle moves along the vehicle recovery board.

It is envisaged that the outer layer projection may be of any suitable cross-sectional shape. Preferably, however, the cross-sectional shape of the outer layer projection includes one or more points or vertices. Thus, in some embodiments of the invention, the cross-sectional shape of the outer layer projection may be triangular, square, rectangular, rhombic, pentagonal, hexagonal, heptagonal, octagonal and so on. In a most preferred embodiment of the invention, the cross-sectional shape of the outer layer projection may be substantially triangular.

In a preferred embodiment of the invention, outer layer projection may comprise an elongate member. It is envisaged that the outer layer projection may be associated with the planar outer layer at a first end thereof, and may extend generally upwardly therefrom such that an opposed second end is configured for engagement with the tyre tread. Most preferably, the first end of the outer layer projection is formed integrally with the planar outer layer, although it is envisaged that the outer layer projection may be formed separately to the planar outer layer and fixedly connected thereto.

The outer layer projection may be of the same shape and/or dimensions along its entire height. Alternatively, the outer layer projection may comprise two or more shapes and/or dimensions along its height. In some embodiments of the invention, the outer layer projection may comprise a base region in a lower region thereof and an engagement region in an upper region thereof. Preferably, the engagement region comprises the one or more engagement portions.

Preferably, the base region is in abutment with, or formed with, the planar outer layer. The base region may extend along any suitable proportion of the height of the outer layer projection. In a preferred embodiment of the invention, the base region may have a greater width than the engagement region. The purpose of this may be to reduce or eliminate the possibility of the outer layer projection from becoming embedded within the tyre tread and/or to reduce or eliminate the possibility of the outer layer projection bending or breaking during use.

The base region may be of any suitable shape. For instance, the base region may be frusto-conical, or may comprise a truncated triangular pyramid or a truncated square pyramid.

In a specific embodiment of the invention, the base region may be substantially in the shape of a truncated triangular pyramid, while the engagement region may be substantially triangular in cross-sectional shape and of a smaller diameter than the base region. Thus, in some embodiments of the invention, the outer layer projection may be substantially butte-shaped when viewed from a side thereof.

In embodiments of the invention in which the engagement region is substantially triangular in cross-sectional shape, it is envisaged that the engagement region may comprises three engagement portions formed at the vertices of the sides of the triangular engagement region.

Thus, in a second aspect, the invention resides broadly in an engagement member comprising a base region configured for association with a support and extending generally upwardly therefrom, and an engagement region located in an upper portion of the engagement member, the engagement region comprising one or more engagement portions configured to engage with an object.

Preferably, the engagement member comprises an outer layer projection according to the first aspect of the invention.

In a preferred embodiment of the invention, the vehicle recovery board may include a traction portion. The traction portion of the vehicle recovery board may be of any suitable form, although it is envisaged that the purpose of the traction portion may be to provide a region of the vehicle recovery board that is configured to facilitate the movement of the vehicle tyre onto the vehicle recovery board. Preferably, the traction portion is provided at or adjacent to an end (and particularly the rear) of the vehicle recovery board.

In a preferred embodiment, the traction portion may comprise one or more traction members adapted to facilitate the vehicle tyre (and therefore the vehicle) moving onto the vehicle recovery board. Any suitable traction members may be provided, although in a preferred embodiment of the invention the traction members may comprise one or more ridges, ribs or the like. The traction members may extend in any suitable direction, although in a preferred embodiment of the invention, the traction members extend substantially laterally across the vehicle recovery board.

In some embodiments of the invention, a traction portion may be formed on each of the first face and the second face of the vehicle recovery board. Alternatively, a traction portion may be formed only on the second face of the vehicle recovery board.

The present invention provides numerous advantages over the prior art. For instance, in comparison with vehicle recovery boards fabricated from relatively inflexible polymeric materials, the present invention provides the ability to bend or flex the vehicle recovery board to more readily match the terrain in which the vehicle is bogged, thereby making the retrieval or recovery of the vehicle easier. However, in comparison to more flexible vehicle recovery boards, the presence of the relatively durable inner layer adds additional mechanical strength to the vehicle recovery board. In addition, both the shape of the outer layer projections, and the fact that the outer layer projections are formed over the inner layer projections provides the vehicle recovery board with additional grip and/or traction, both with the ground surface on which it is placed and with the tyre of the vehicle to be recovered.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION

Figure 1:
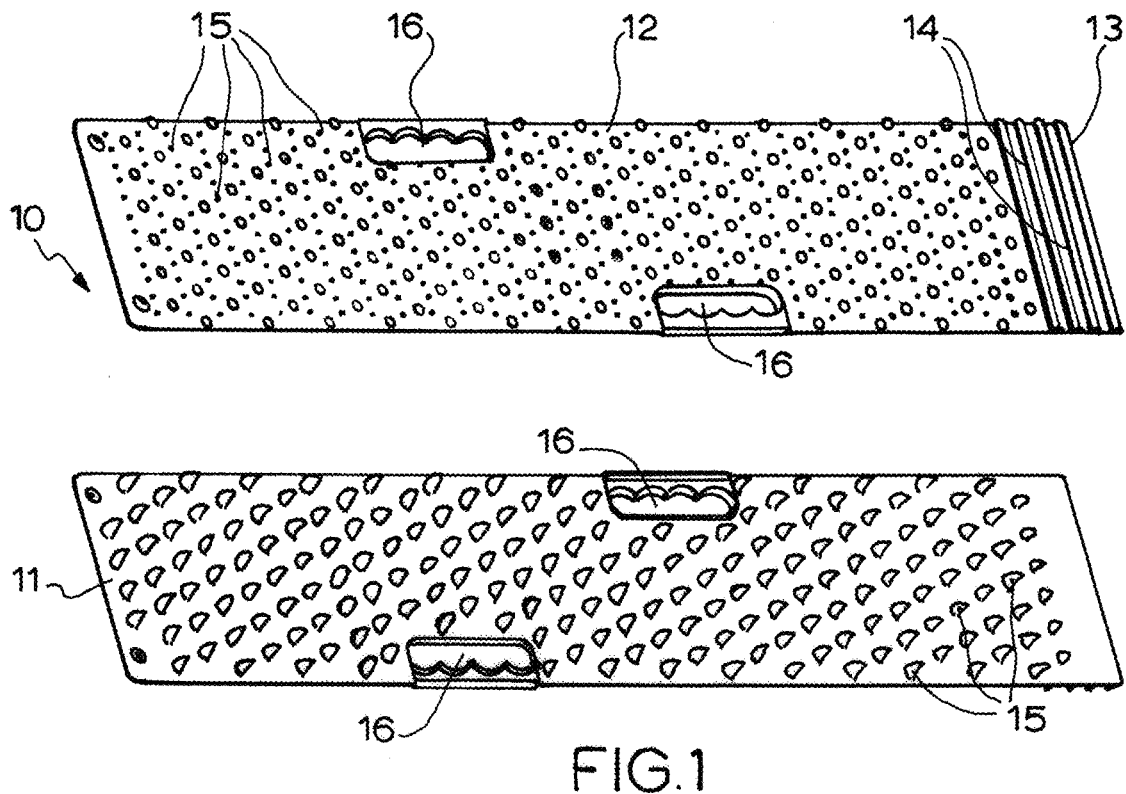
FIG. 1 illustrates isometric views of a vehicle recovery board according to an embodiment of the present invention.

FIG. 1 illustrates isometric views of a vehicle recovery board 10 according to an embodiment of the present invention. In this Figure, opposed faces of the vehicle recovery board 10 are illustrated, with the first face 11 configured to be placed at least partially in abutment with a ground surface (not shown) and the second face 12 configured to be located facing generally upwardly in use so that a vehicle tyre (not shown) can drive onto the second face 12 and gain traction on the surface thereof.

As can be seen in FIG. 1, the vehicle recovery board 10 is generally rectangular in shape, with a length greater than its width. It is envisaged that, in use, the vehicle recovery board 10 will be oriented so that the length of the vehicle recovery board 10 (i.e. the long axis of the vehicle recovery board 10) is substantially parallel to the direction of travel of the vehicle (not shown).

The second face 12 of the vehicle recovery board 10 includes a traction portion 13 at an end thereof. The traction portion 13 includes a plurality of ribs or ridges 14 extending across the width of the vehicle recovery board 10. In use, the traction portion 13 is placed under, or in close proximity to, the tyre of a vehicle (not shown) in order to provide grip and/or traction for the tyre to drive onto the second surface 12. Thus, in the embodiment of the invention shown in FIG. 1, the vehicle drives onto the vehicle recovery board 10 from the right hand side thereof.

The second surface comprises a plurality of outer layer projections 15 extending outwardly therefrom. The outer layer projections 15 comprise a plurality of different sizes, shapes and are provided at a variety of spacings to one another. In this way, at least a portion of the outer layer projections 15 engage with the tread on a vehicle tyre (not shown) and, in particular, enter the grooves in the tread in order to provide traction and/or grip.

The vehicle recovery board 10 is provided with a pair of handle portions 16 in the form of apertures that extend through the vehicle recovery board 10. The handle portions 16 are configured to provide a user with the ability to easily grip and manoeuvre the vehicle recovery board 10.

As previously stated, the first face 11 of the vehicle recovery board 10 is configured to be placed in abutment with a ground surface. The second face 11 comprises a plurality of outer layer projections 15 in the form of claws or teeth. The claws or teeth include a ground-engaging point or apex that extend generally towards the end of the vehicle recovery board 10 at which the traction portion 13 is located. Thus, the claws or teeth are oriented in the opposite direction to the direction of travel of the vehicle (not shown). It is envisaged that by providing the outer layer projections 15 on the first face 11 with such an orientation that as the vehicle drives onto the vehicle recovery board, the rotation of the vehicle's wheels may results in the outer layer projections 15 of the first face 11 penetrating further into the ground surface. In this way, movement of the vehicle recovery board 10 relative to the ground surface may be reduced or eliminated. In this embodiment, the outer layer projections 15 on the first face 11 are all substantially the same size and shape, and are all spaced approximately equidistant from one another.

At least a portion of the outer layer projections 15 are formed over inner layer projections (obscured) provided on an inner layer (obscured) of the vehicle recovery board 10.

Figure 2:
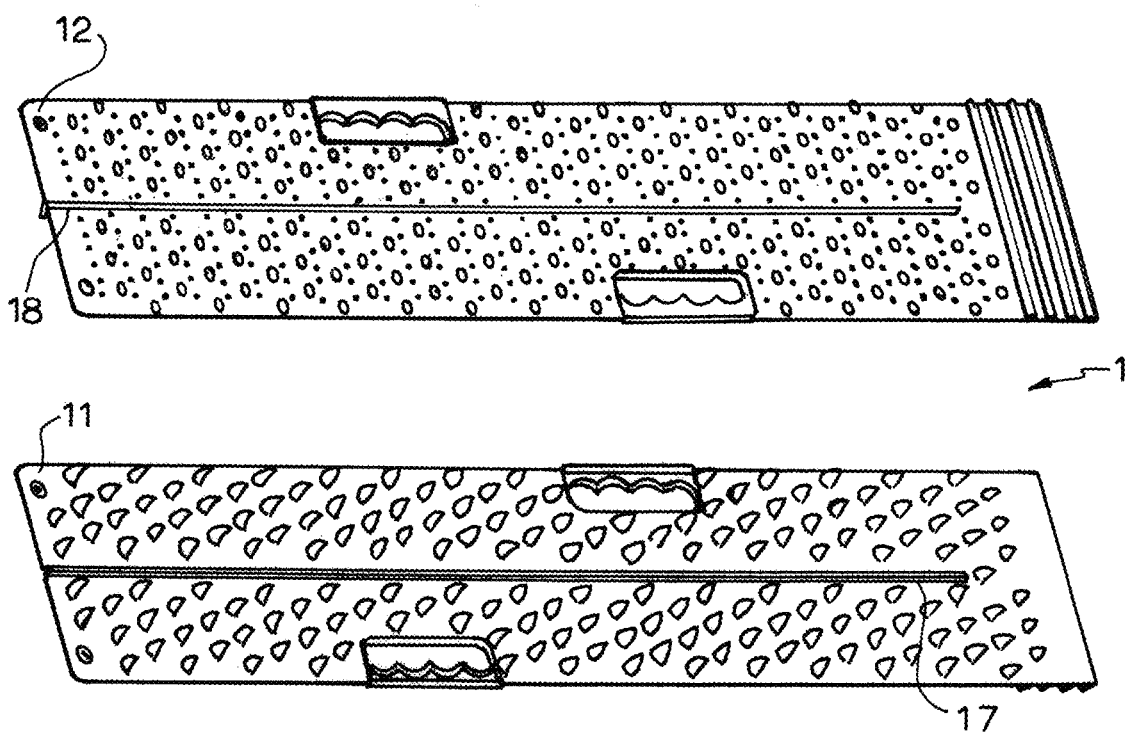
FIG. 2 illustrates isometric views of a vehicle recovery board according to an embodiment of the present invention.

FIG. 2 illustrates isometric views of a vehicle recovery board 10 according to an embodiment of the present invention. The vehicle recovery board 10 of FIG. 2 is largely identical to that illustrated in FIG. 1 with the exception that the vehicle recovery board 10 of FIG. 2 includes a longitudinally extending ridge 17 in the first face 11 thereof. The ridge 17 is formed in the first face 11 such that a corresponding longitudinally extending channel 18 in the second face thereof. The ridge 17/channel 18 provides the vehicle recovery board 10 with additional strength and durability.

Figure 3:
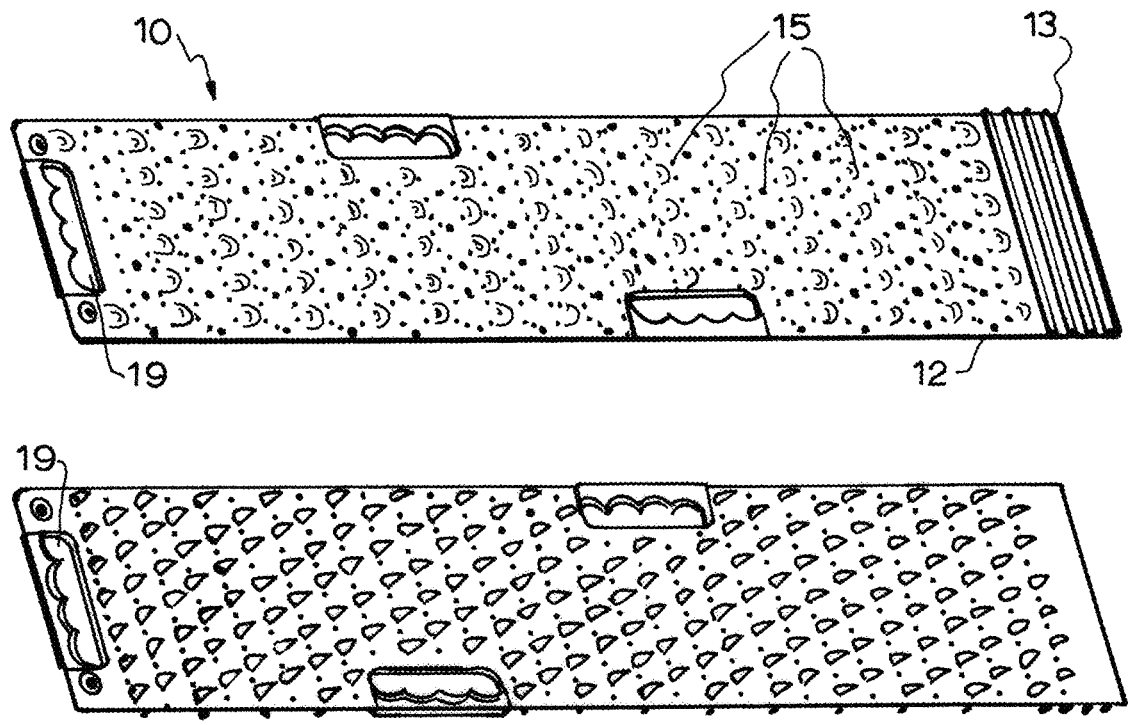
FIG. 3 illustrates isometric views of a vehicle recovery board according to an embodiment of the present invention.

FIG. 3 illustrates isometric views of a vehicle recovery board 10 according to an embodiment of the present invention. The vehicle recovery board 10 of FIG. 3 is largely identical to that illustrated in FIGS. 1 and 2 with the exception that the vehicle recovery board 10 of FIG. 3 includes an additional handle portion 19 in an end thereof. The additional handle portion 19 is provided in the opposed end of the vehicle recovery board 10 to that in which the traction portion 13 is located.

In addition, while the purpose and constructions of the outer layer projections 15 on the second face 12 is substantially the same as for FIGS. 1 and 2, the pattern and spacing of the outer layer projections 15 on the second face 12 is different to that of FIGS. 1 and 2 in order to provide improved engagement of the outer layer projections 15 with the tyre tread of a vehicle (not shown) in use.

Figure 4:
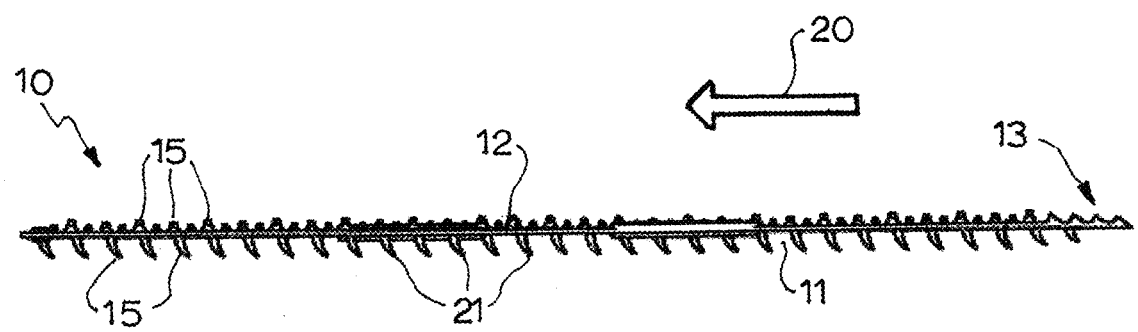
FIG. 4 illustrates a side view of a vehicle recovery board according to an embodiment of the present invention.

In FIG. 4 a side view of a vehicle recovery board 10 according to an embodiment of the present invention is illustrated. In this Figure, it may be seen that the outer layer projections 15 on both the first face 11 and the second face 12 extend generally outwardly from the substantially planar vehicle recovery board 10.

It may be seen in FIG. 4 that the outer layer projections 15 on the first surface 11 curve towards the end of the vehicle recovery board 10 at which the traction portion 13 is located. Thus, the vehicle (not shown) moves along the vehicle recovery board 10 in the direction of travel indicated by arrow 20. As the vehicle moves along the vehicle recovery board 10, it is envisaged that both the weight of the vehicle and the revolution of the tyres relative to the vehicle recovery board 10 result in the ground-engaging portions 21 of the outer layer projections 15 on the first face further penetrating the ground surface and reducing or eliminating movement of the vehicle recovery board 10 relative to the ground surface.

Figure 5:
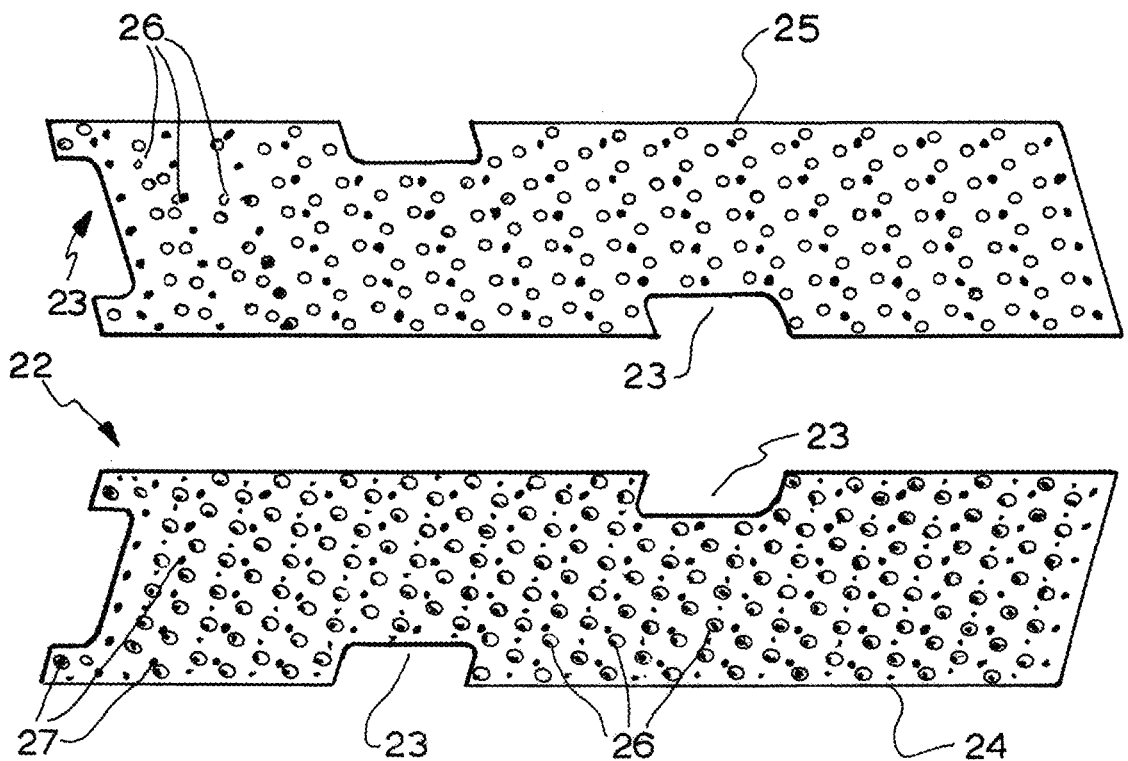
FIG. 5 illustrates isometric views of the inner layer of a vehicle recovery board according to an embodiment of the present invention.

FIG. 5 illustrates isometric views of an inner layer 22 of a vehicle recovery board according to an embodiment of the present invention. The inner layer 22 is fabricated from a metallic material (in this case aluminium) and is substantially planar in form. By fabricating the inner later 22 from a lightweight metal, the inner layer 22 provides durability and mechanical strength to the vehicle recovery board, while also provided the vehicle recovery board with a degree of flex such that the vehicle recovery board can be used to at least partially match the shape of the terrain in which it is being used.

The inner layer 22 is substantially rectangular in shape, with a length greater than its width, in much the same way as the vehicle recovery board. The inner layer 22 is provided with a plurality of cut out portions 23 therein. The location of the cut out portions 23 corresponds to the locations of the handle portions (not shown in this Figure) in the vehicle recovery board.

The first face 24 of the inner layer 22 and the opposed second face 25 of the inner layer 22 are provided with a plurality of inner layer projections 26 that extend generally outwardly therefrom. In the assembled vehicle recovery board, each of the inner layer projections 26 is overlain by an outer layer projection (not shown in this Figure). The inner layer projections 26 may either be received within a formed outer layer projection, or the outer layer (not shown in this Figure) may be formed over the inner layer 22 by applying the outer layer in the form of a hardenable liquid to the inner layer 22. In this instance, the outer layer projections are moulded over the inner layer projections 26.

The inner layer 22 further comprises a plurality of apertures 27 therein. The plurality of apertures are provided in order to assist in securing the inner layer 22 in place within the vehicle recovery board and/or to allow an upper member and a lower member of the outer layer (not shown in this Figure) to be connected to one another. In embodiments of the invention in which the outer layer is applied to the inner layer 22 in the form of a hardenable liquid (such as in an injection moulding process), it is envisaged that the hardenable liquid may flow through the apertures 27 and harden, thereby ensuring that the inner layer is held in place within the vehicle recovery board. In embodiments in which the outer layer is provided in the form of an upper member and an lower member, it is envisaged that locking members located on the inner surface of the inner member and/or the outer layer may pass through the apertures 27 and connect to the other of the upper member or the lower member.

Figure 6:
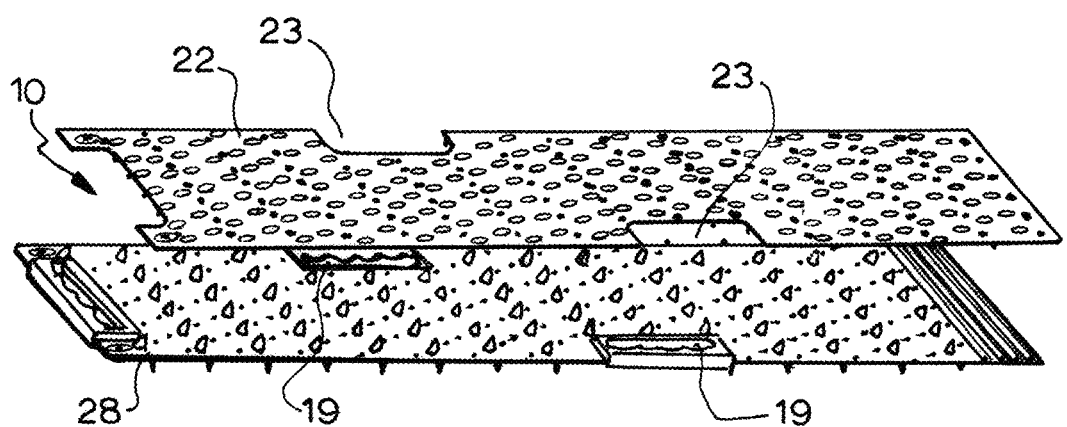
FIG. 6 illustrates an exploded view of a vehicle recovery board according to an embodiment of the present invention.

In FIG. 6 an exploded view of a vehicle recovery board 10 is illustrated. FIG. 6 illustrates how the inner layer 22 aligns with the outer layer 28. It will be understood that the inner layer 22 will be encapsulated within the outer layer 28 in use, and that FIG. 6 merely illustrates the relative position of the inner layer 22 within the outer layer. In particular, FIG. 6 illustrates how cut out portions 23 the reinforcing inner layer 22 align with the handle portions 19 in the outer layer 28.

Figure 7:
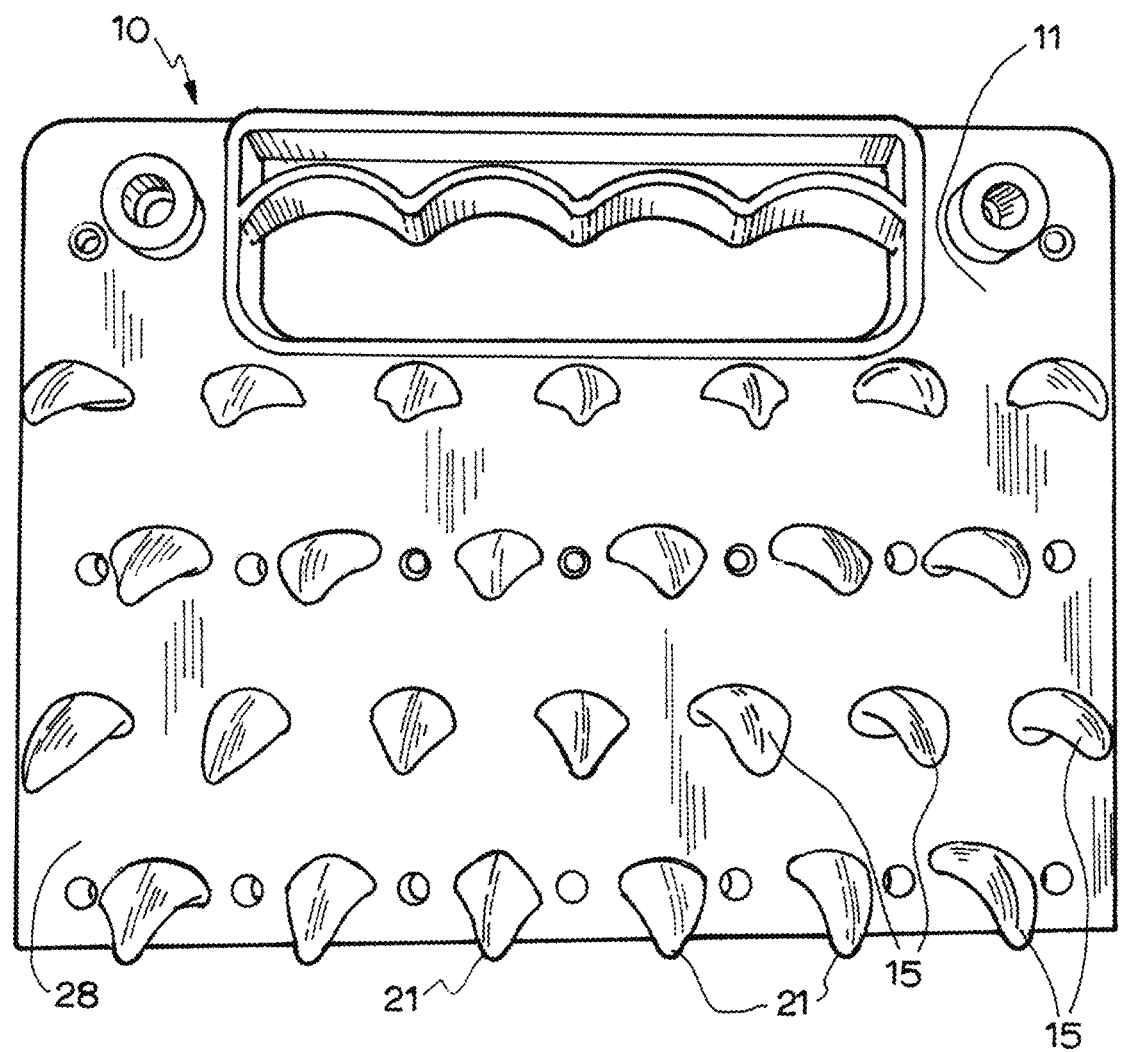
FIG. 7 illustrates a plan view of a vehicle recovery board according to an embodiment of the present invention.

FIG. 7 illustrates a plan view of a vehicle recovery board 10 according to an embodiment of the present invention. The first face 11 of the outer layer 28 of the vehicle recovery board 10 is illustrated, and the outer layer projections 15 may be seen.

In particular, the ground-engaging portions 21 of the outer layer projections 15 may be seen, along with the manner in which the outer layer projections 15 curve to form the shape of a claw or tooth. The shape of the outer layer projections 15 and the ground-engaging portions 21 together allow the outer layer projections to penetrate the ground surface on which the vehicle recovery board 10 is being used and reduce or eliminate movement of the vehicle recovery board 10 relative to the ground surface.

Figure 8:
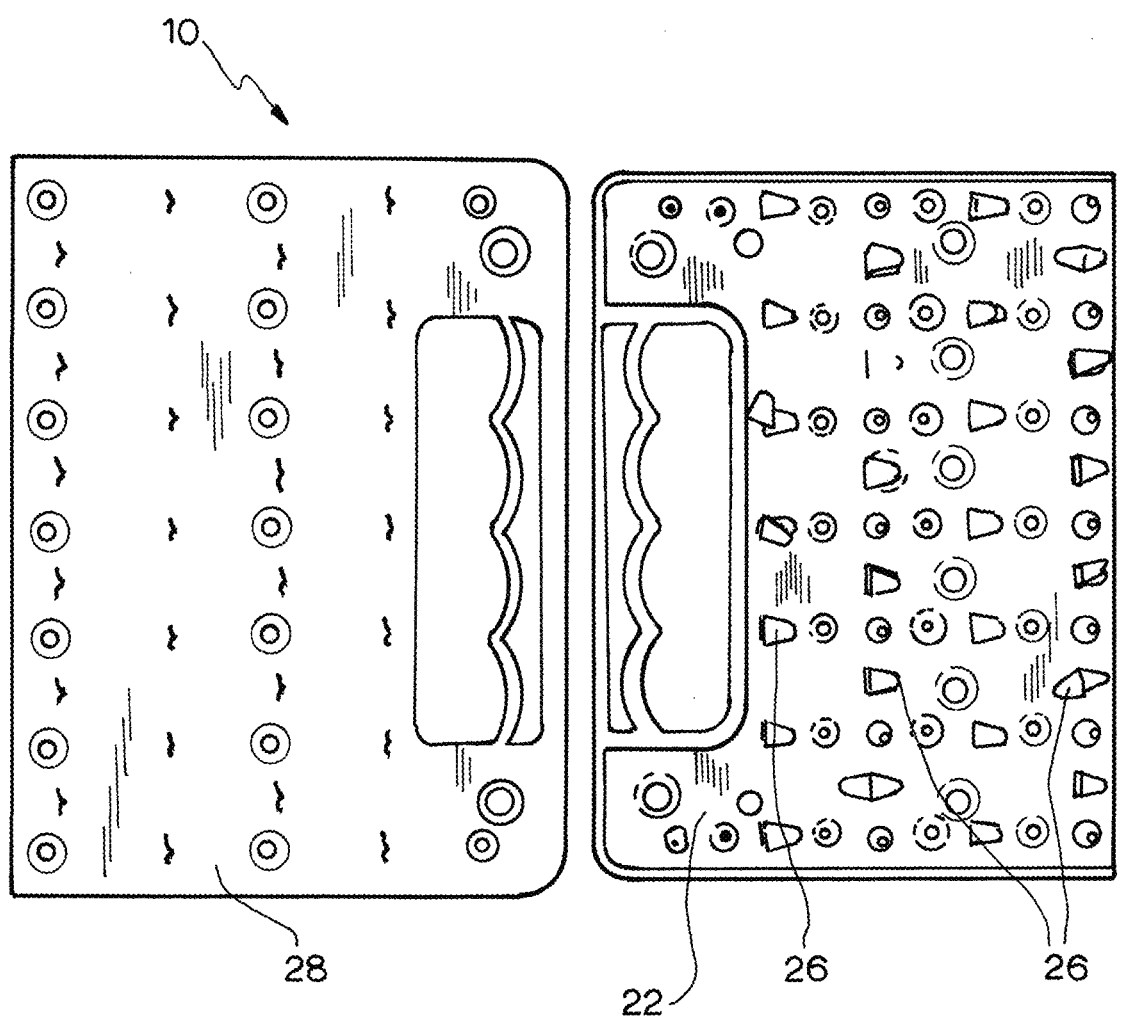
FIG. 8 illustrates a plan view of a vehicle recovery board according to an embodiment of the present invention.

FIG. 8 illustrates a plan view of a vehicle recovery board 10 according to an embodiment of the present invention. In this Figure, the outer layer 28 has been split to reveal the inner layer 22 housed therein. The inner layer projections 26 may be more clearly seen. In the embodiment of the invention shown in FIG. 8, the inner layer projections 26 are stamped or pressed out of the planar inner layer 22 and moved relative to the planar inner layer 22 so as to extend generally outwardly therefrom.

Figure 9:
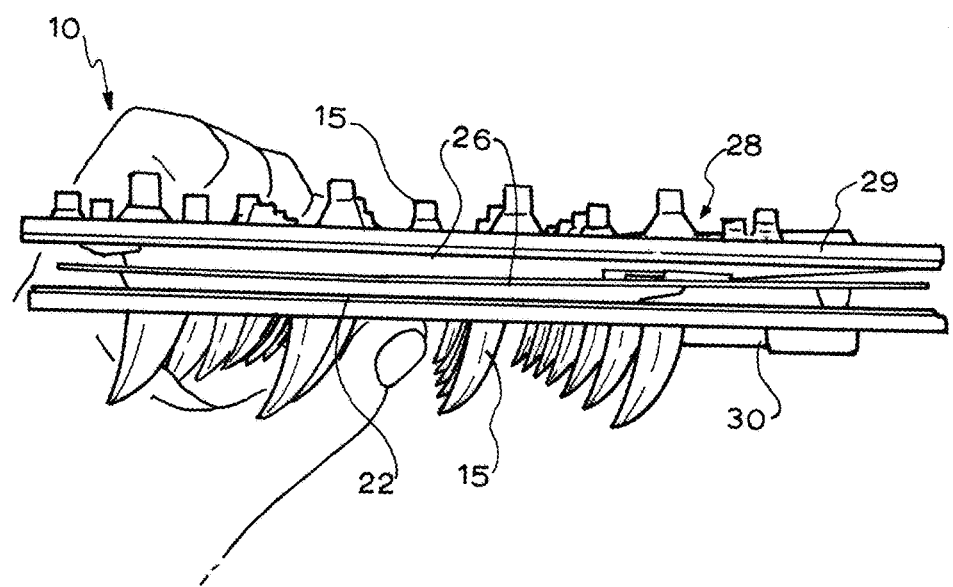
FIG. 9 illustrates a cross-sectional view of a vehicle recovery board according to an embodiment of the present invention.

FIG. 9 illustrates a cross-sectional view of a vehicle recovery board 10 according to an embodiment of the present invention. in this embodiment of the invention, the outer layer 28 may either be provided in the form of an upper member 29 and a lower member 30, or the outer layer 28 may have been formed as an integral layer (for instance from a hardenable material) that has been split into layers 29, 30 for illustrative purposes.

The inner layer 22 of reinforcing material may be seen positioned between the layers 29, 30 of the outer layer 28. The inner layer 22 includes a plurality of inner layer projections 26 that extend outwardly from opposed faces of the inner layer 22.

At least a portion of the outer layer projections 15 that extend from the layers 29, 30 of the outer layer 28 are formed over the inner layer projections 15. By forming the outer layer projections 15 over the inner layer projections 26, the inner layer projections 15 reinforce the outer projections 15 and provide improved mechanical strength and durability thereto. In addition, if the outer layer projections 15 are damaged during use (such that the polymeric outer layer projections 15 are deformed, broken, melted or otherwise removed) the metallic inner layer projections 26 will still be present meaning that the vehicle recovery board 10 may still function.

In FIG. 9 it may also be seen that an upper portion of the outer layer projections 15 is shaped to as to engage with a tyre tread, and in particular to be received within, and provide traction with, the grooves of a tyre tread.

Figure 10:
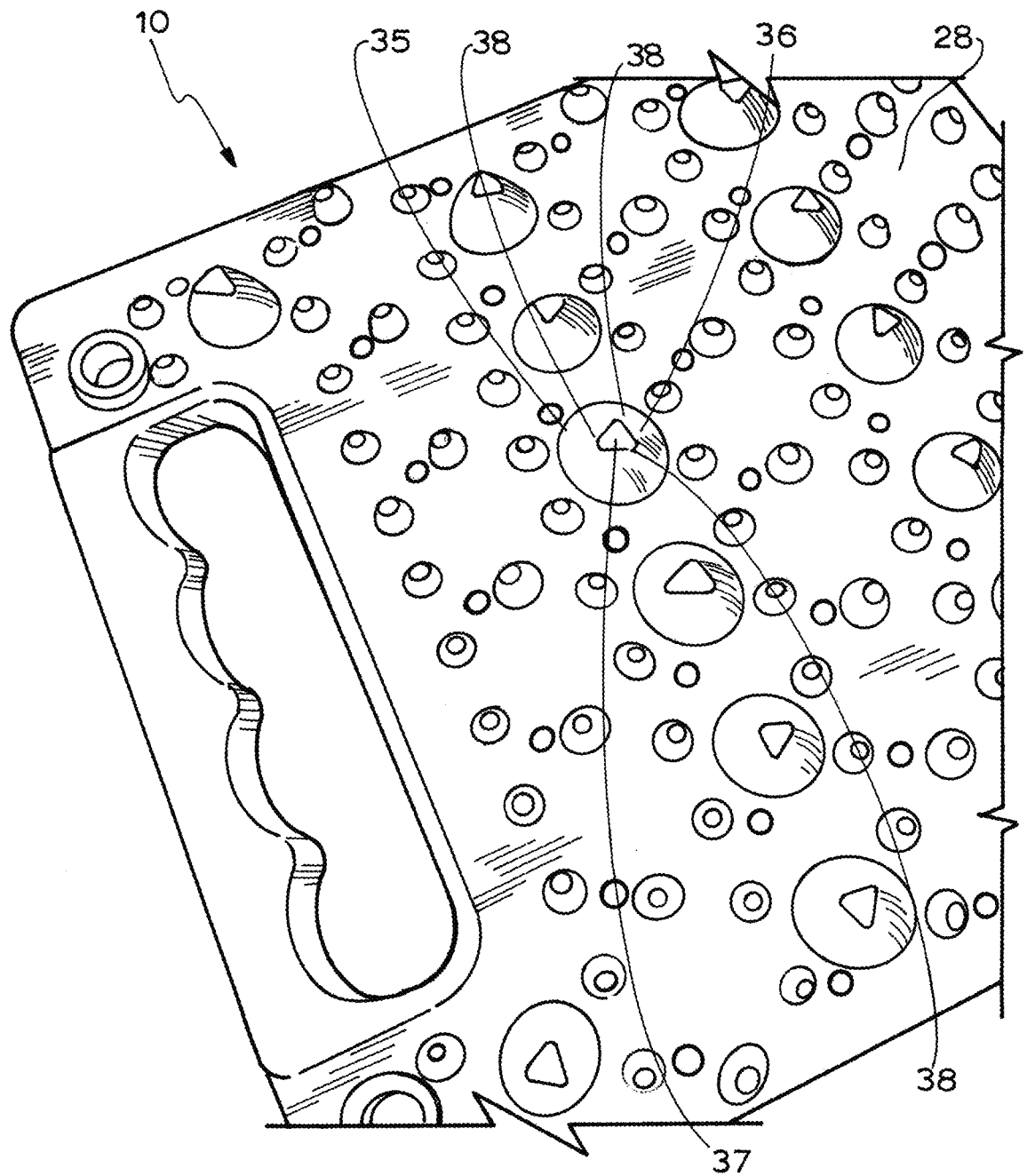
FIG. 10 illustrates an isometric view of a vehicle recovery board according to an embodiment of the invention in which a plurality of engagement members is provided.

FIG. 10 illustrates an isometric view of a vehicle recovery board 10 according to an embodiment of the invention. The vehicle recovery board 10 comprises a plurality of outer layer projections/engagement members 35.

The engagement members 35 comprise elongate members that extend generally upwardly from the planar outer layer 28. The engagement members 35 comprise a base region 36 generally in the form of a truncated triangular pyramid that is formed integrally with the outer layer 28 at a lower end thereof. The engagement member 35 comprises an engagement region 37 in an upper region thereof, the engagement region being substantially triangular in cross-section. The engagement region 37 is of a lesser diameter than the base region 36 and comprises a plurality of engagement portions 38 located at the vertices of the sides of the triangular engagement region.

It is envisaged that, in use, as a tyre move along the recovery board 10, the engagement member 35 (or at least the engagement region 37 thereof) will be received in the tread of the tyre, and in particular a groove of the tread. The engagement region 37 is shaped such that at least one of the engagement portions 38 engages with (or at least abuts) the inner surface of a groove in the tyre tread in a frictional engagement. This provides additional traction between the tyre and the vehicle recovery board 10. However, by providing a base region 36 that is wider that the engagement region 37, the chances of the engagement member 35 penetrating so far into the tread of the tyre that disengagement becomes difficult is reduced or eliminated.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A vehicle recovery board comprising:
   an inner layer fabricated from a first material, the inner layer including a first face and an opposed second face, wherein the first face and the second face each comprise a plurality of inner layer projections extending outwardly therefrom; and
   an outer layer fabricated from a second material, the outer layer including an upper outer layer configured to substantially overlie the first face and a lower outer layer configured to substantially cover the second face of the inner layer, wherein the upper outer layer and the lower outer layer comprise a plurality of outer layer projections extending outwardly therefrom and at least a portion of projections on the lower outer layer extend outwardly in a different direction from projections on the upper outer layer,
   and wherein at least a portion of the plurality of outer layer projections are formed over at least a portion of the inner layer projections.

2. A vehicle recovery board according to claim 1 wherein the inner layer extends along substantially the entire length of the vehicle recovery board and/or substantially the entire width of the vehicle recovery board.

3. A vehicle recovery according to claim 1 wherein the vehicle recovery board is capable of flexing or bending.

4. A vehicle recovery board according to claim 1 wherein the first material and the second material are resiliently deformable.

5. A vehicle recovery board according to claim 1 wherein the first material is of greater rigidity than the second material.

6. A vehicle recovery board according to claim 1 wherein the first material comprises a metallic material.

7. A vehicle recovery board according to claim 1 wherein the inner layer projections are formed by stamping, pressing or otherwise cutting the inner layer to form a tab.

8. A vehicle recovery board according to claim 1 wherein the inner layer of the recovery board is provided with one or more apertures therethrough.

9. A vehicle recovery board according to claim 8 wherein at least one of the one or more apertures in the inner layer align with one or more apertures in the outer layer.

10. A vehicle recovery board according to claim 1 wherein the second material is a polymeric material.

11. A vehicle recovery board according to claim 10 wherein the polymeric material is UV stabilised nylon or UV stabilised polypropylene.

12. A vehicle recovery board according to claim 1 wherein the inner layer is spaced inwardly from a periphery of the vehicle recovery board about at least a portion of the periphery of the vehicle recovery board.

13. A vehicle recovery board according to claim 1 where the outer layer is molded on the inner layer.

14. A vehicle recovery board according to claim 1 wherein the lower outer layer of the vehicle recovery board is configured to be placed in abutment with a ground surface, and the upper outer layer of the vehicle recovery board is configured to be placed facing generally upwardly so that a vehicle tire may be driven onto the upper outer layer.

15. A vehicle recovery board according to claim 14 wherein at least a portion of the outer layer projections on the lower outer layer of the vehicle recovery board may be provided with one or more ground-engaging portions configured to at least partially penetrate the ground surface so as to reduce or eliminate movement of the vehicle recovery board relative to the ground surface in use.

16. A vehicle recovery board according to claim 15 wherein the ground-engaging portions include one or more points, needles or claws.

17. A vehicle recovery board according to claim 15 wherein at least a portion of the outer layer projections on the lower outer layer of the recovery board are shaped to that the ground-engaging portions thereof are oriented generally towards an end of the vehicle recovery board.

18. A vehicle recovery board according to claim 14 wherein at least a portion of the outer layer projections on the upper outer layer of the vehicle recovery board are shaped to be received within the tread pattern of the vehicle tire.

19. A vehicle recovery board according to claim 18 wherein the at least a portion of the outer layer projections on the upper outer layer of the recovery board comprise one or more engagement portions configured to engage with, or at least abut, the tread pattern.

20. A vehicle recovery board according to claim 1 wherein the vehicle recovery board includes a traction portion configured to facilitate the movement of the vehicle tire onto the vehicle recovery board.

21. A vehicle recovery board according to claim 20 wherein the traction portion is provided at or adjacent an end of the vehicle recovery board.

22. A vehicle recovery board comprising:
   an inner layer fabricated from a first material, the inner layer including a first face and an opposed second face, wherein the first face and the second face each comprise a plurality of inner layer projections extending outwardly therefrom, the inner layer projections being of two or more different shapes and/or sizes; and
   an outer layer fabricated from a second material, the outer layer configured to substantially overlie the first face and the second face of the inner layer, wherein the outer layer comprises a plurality of outer layer projections extending outwardly therefrom, and wherein at least a portion of the plurality of outer layer projections are formed over at least a portion of the inner layer projections.

\* \* \* \* \*